(12) United States Patent
Laurila

(10) Patent No.: US 7,512,092 B2
(45) Date of Patent: Mar. 31, 2009

(54) SYSTEM AND METHOD FOR TEST LOOP TIMER OPERATION

(75) Inventor: Jukka Laurila, Pahkinamaentie (FI)

(73) Assignee: Nokia Corporation, Espoo (FI)

( * ) Notice: Subject to any disclaimer, the term of this patent is extended or adjusted under 35 U.S.C. 154(b) by 429 days.

(21) Appl. No.: 11/018,294

(22) Filed: Dec. 21, 2004

(65) Prior Publication Data

US 2006/0132265 A1 Jun. 22, 2006

(51) Int. Cl.
*H04W 4/00* (2009.01)
*H04B 17/00* (2006.01)

(52) U.S. Cl. .................. 370/328; 370/326; 370/249; 455/115.1

(58) Field of Classification Search .......... 370/328, 370/249, 326; 455/115.1; 714/733
See application file for complete search history.

(56) References Cited

U.S. PATENT DOCUMENTS 6,131,174 A * 10/2000 Fischer et al. .............. 714/733

OTHER PUBLICATIONS

3GPP TS 44.014 V6.1.0(Jul. 2004) section 5.5.*
Change request, T-Doc GP-041613 concerning TS 44.014. 3GPP TSG-Geran Meeting #20, Bilbao, Spain Jun. 21-25, 2004, pp. 1 and 3.*
GPRS Protocols: SNDCP, Tampere University of Technology, JUSSI VISURI, Apr. 8, 2000, 9 pages.
$3^{rd}$ Generation Partnership Project; Technical Specification Group GSM/Edge Radio Access Network; Individual equipment type requirements and interworking; Special conformance testing functions (Release 1999), 3GPP Organization Partners, 2003, pp. 1-44.
$3^{rd}$ Generation Partnership Project; Technical Specification Group GSM/Edge Radio Access Network; General Packet Radio Service (GPRS); Mobile Station (MS)—Base Station System (BSS) interface; Radio Link Control/Medium Access Control (RLC/MAC) protocol (Release 1999), 3GPP Organization Partners, 2003, pp. 1-315.
3GPP TS 44.014 V6.1.0(Jul. 2004), Technical Specification; $3^{rd}$ Generation Partnership Project; Technical Specification Group GSM Edge Radio Access Network; Individual equipment type requirements and interworking; Special conformance testing functions (Release 6).
Change Request, T-doc GP-041613 concerning TS 44.014; 3GPP TSG-Geran Meeting #20, Bilbao, Spain Jun. 21-25, 2004.

* cited by examiner

*Primary Examiner*—Lester Kincaid
*Assistant Examiner*—Charles Shedrick
(74) *Attorney, Agent, or Firm*—Banner & Witcoff, Ltd.

(57) ABSTRACT

A system and method for test loop timer operation. A mobile station implementing a test procedure may receive a command to enter a test mode. A timer may be enabled and RLC data blocks may be transmitted. The timer may be disabled when a quantity of the RLC data blocks exceeds a transmit window size or when a countdown value is equal to zero. The the test mode may be a switched radio block loopback mode and the timer may be a T3182 timer. Embodiments of the invention may be implemented in a mobile communication system.

27 Claims, 4 Drawing Sheets

SYSTEM AND METHOD FOR TEST LOOP TIMER OPERATION

FIELD OF THE INVENTION

The present invention relates to the field of mobile device testing and, in particular, to systems and methods for operating timers during testing of a mobile device such as a mobile telephone, for example.

BACKGROUND

Many mobile devices in use today are based on the Global Standard for Mobile Communications (the GSM standard). The GSM standard is continually evolving and currently consists of a variety of platforms, including the basic GSM standard, General Packet Radio Service (GPRS), Enhanced Data rates for GSM Evolution (EDGE) and third generation GSM services (3GSM) based on the latest Wide Band Code Division Multiple Access (WCDMA) technology. In addition, the 3rd Generation Partnership Project (3GPP) continues to define, refine and enhance the current standards for mobile communications.

GPRS utilizes packet switched data. GPRS includes several mobile networking layers, including, among others, the Radio Resource (RR) sublayer, which provides the functions necessary for RR management of packet data physical channels (PDCHs) and Radio Link Control and Medium Access Control (RLC/MAC) on packet data physical channels. The RR sublayer provides services for the transfer of upper layer PDUs using a shared medium between multiple mobile stations and the network. Direct communication is possible only between the network and one or more mobile stations. The RLC/MAC function supports two modes of operation: unacknowledged operation and acknowledged operation.

The RLC function defines the procedures for segmentation and reassemble of logical link control (LLC) PDUs into RLC/MAC blocks. In RLC acknowledged mode of operation, the RLC function also defines the Backward Error Correction (BEC) procedures enabling the selective retransmission of unsuccessfully delivered RLC/MAC blocks. In RLC acknowledged mode of operation, the RLC function preserves the order of higher layer PDUs provided to it.

The MAC function defines the procedures that enable multiple mobile stations to share a common transmission medium, which may consist of several physical channels. The function may allow a mobile station to use several physical channels in parallel, i.e., to use several timeslots within the time division multiple access (TDMA) frame. For the mobile station originating access, the MAC function provides the procedures, including the contention resolution procedures, for the arbitration between multiple mobile stations simultaneously attempting to access the shared transmission medium. For the mobile station terminating access, the MAC function provides the procedures for queuing and scheduling of access attempts.

Mobile devices based on the aforementioned standards and platforms periodically undergo testing to ensure reliable and effective mobile communications. The 3GPP defines special conformance testing functions that are implemented on mobile devices. In particular, mobile devices based on EDGE technology should support Enhanced GPRS (EGPRS) testing, one test mode of which is referred to as Switch Radio Block Loopback mode.

Switch Radio Block Loopback mode is a physical RF layer loopback performed before channel decoding/encoding and is designed to support Bit Error Ratio (BER) testing. When a mobile device is directed to enter a Switch Radio Block Loopback test mode, the RLC is put into unacknowledged mode and delivers RLC blocks to the physical network layer. When the RLC delivers a quantity of RLC blocks to the physical layer greater than an RLC transmit window size or when the RLC is ready to deliver a block with a countdown (CV) value equal to zero, the RLC should start timer T3182 if it has not received a Packet Uplink ACK/NACK signal. However, if the Switch Radio Block Loopback submode is ON, the RLC cannot receive a Packet Uplink ACK/NACK because control messages are not allowed when this submode is ON. Thus, the RLC starts the T3182 timer, which has a value of five seconds. When the T3182 timer expires, the Uplink Temporary Block Flow (UL TBF) is released and the test mode ends earlier than desired.

SUMMARY

According to embodiments of the present invention, a method for testing a mobile station may include receiving a command to enter a test mode; enabling a timer; transmitting RLC data blocks; and disabling the timer when a quantity of the RLC data blocks exceeds a transmit window size or when a countdown value is equal to zero. The test mode may be a switched radio block loopback mode and the timer may be a T3182 timer. The mobile station may be a mobile telephone and may be configured for implementing the GPRS protocol. The method may further include re-enabling the timer after the last data block has been transmitted. The method may further include requesting an uplink to a communications network.

According to embodiments of the present invention, a system for testing a mobile station may include a communications network for issuing commands; a mobile system for receiving and transmitting information; and a timer resident in the mobile station. The mobile station may be configured to disable the timer when the station system has issued a command to put the mobile station in a test mode and when a quantity of the RLC data blocks transmitted by the mobile station exceeds a transmit window size or a countdown value is equal to zero. The mobile station may be configured to implement the GPRS protocol.

According to embodiments of the present invention, a computer program product that includes a computer useable medium having computer program logic recorded thereon for enabling a processor to implement a test procedure may include a receiving procedure that enables the processor to receive a command to enter a test mode; an enabling procedure that enables the processor to enable a timer; a transmitting procedure that enables the processor to transmit RLC data blocks; and a disabling procedure that enables the processor to disable the timer when a quantity of the RLC data blocks exceeds a transmit window size or when a countdown value is equal to zero.

According to embodiments of the present invention, a device for implementing a testing procedure may include a mobile system for receiving and transmitting information; and a timer resident in the mobile station. The mobile system may be configured to disable the timer when the mobile system has received a command to put the mobile station in a test mode and when a quantity of RLC data blocks transmitted by the mobile station exceeds a transmit window size or a countdown value is equal to zero.

BRIEF DESCRIPTION OF THE DRAWINGS

A detailed description of embodiments of the invention will be made with reference to the accompanying drawings, wherein like numerals designate corresponding parts in the several figures.

DETAILED DESCRIPTION OF EXEMPLARY EMBODIMENTS

In the following description of some embodiments, reference is made to the accompanying drawings which form a part hereof, and in which is shown by way of illustration specific embodiments in which the invention may be practiced. It is to be understood that other embodiments may be utilized and structural changes may be made without departing from the scope of these embodiments of the present invention.

Embodiments of the present invention are directed toward mobile device testing. Although embodiments of the present invention are discussed in the context of mobile telephones operating in a test mode, embodiments of the present invention may be used with a variety of mobile devices in a variety of environments. For example, embodiments of the present invention may be used with mobile telephones, PDAs, pagers and the like. In addition, mobile devices with which embodiments of the present invention may be used may also include vehicle mounted stations, portable stations, handheld stations, vehicle mounted/portable stations, vehicle mounted/handheld stations and the like. In addition, embodiments of the present invention may be used in a mobile networked environment or other type of communication environment. For example, embodiments of the present invention may be used in a Global System for Mobile Communications/Enhanced Global Rates for Global Evolution (GSM/EDGE) Radio Access Network or in mobile communication systems implementing the General Packet Radio Service (GPRS) protocol.

Figure 1:
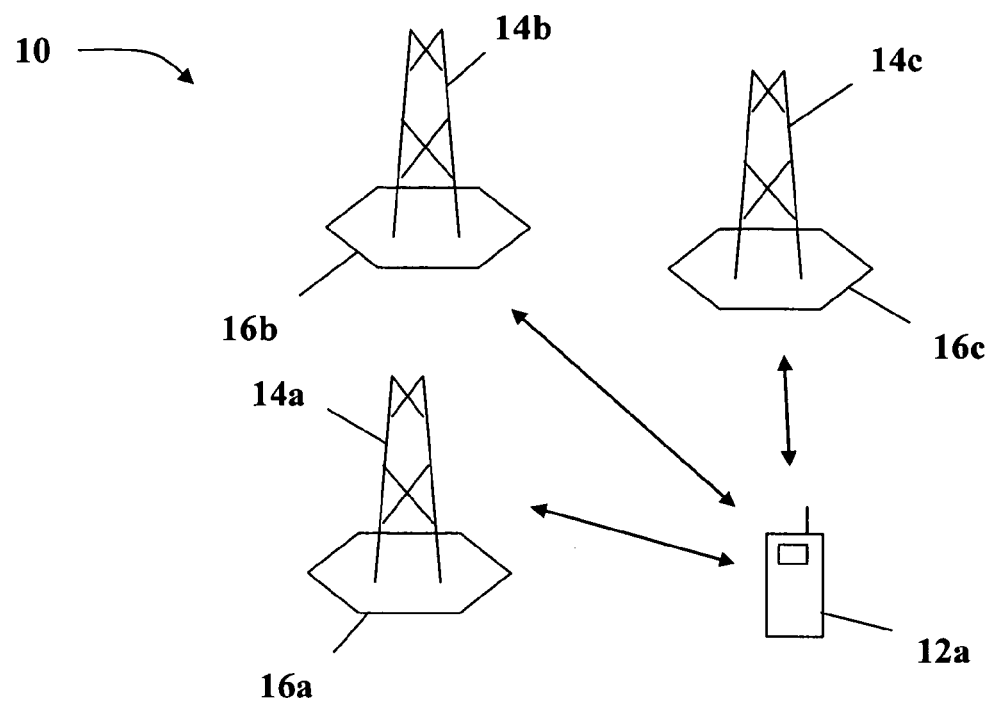
FIG. 1 is a generalized block diagram of a mobile system environment in which embodiments of the invention may be used according to an embodiment of the present invention.

FIG. 1 shows a mobile environment 10 in which embodiments of the present invention may be used. The mobile environment 10 includes, without limitation, a mobile station (MS) 12a configured to communication with a communications network comprising one or more network elements such as base station systems (BS) 14a, 14b and 14c. Each of the BS 14a, 14b and 14c may reside within a cell cite 16a, 16b and 16c, respectively. Alternatively, communications network may include one or more system simulators configured for issuing commands to the MS 12a. The MS 12a may be a mobile telephone, PDA or other mobile device. The MS 12a may be configured with a processor, memory, I/O and the like as is common in the art. In addition, the MS 12a may be configured with one or more computer programs providing functionality to the MS 12a.

The MS 12a may communicate with each BS 14a, 14b and 14c as the MS 12a travels from one cell cite 16a, 16b and 16c to the next. Each BS 14a, 14b and 14c may handoff communication to an adjacent BS 14a, 14b and 14c to enable communication with the MS 12a as the MS 12a leaves one cell cite 16a, 16b and 16c and enters another. In fact, in some situations, such as during soft handoff in a WCDMA system for example, the MS 12a may communication with several BS 14a, 14b, and 14c simultaneously.

Figure 2:
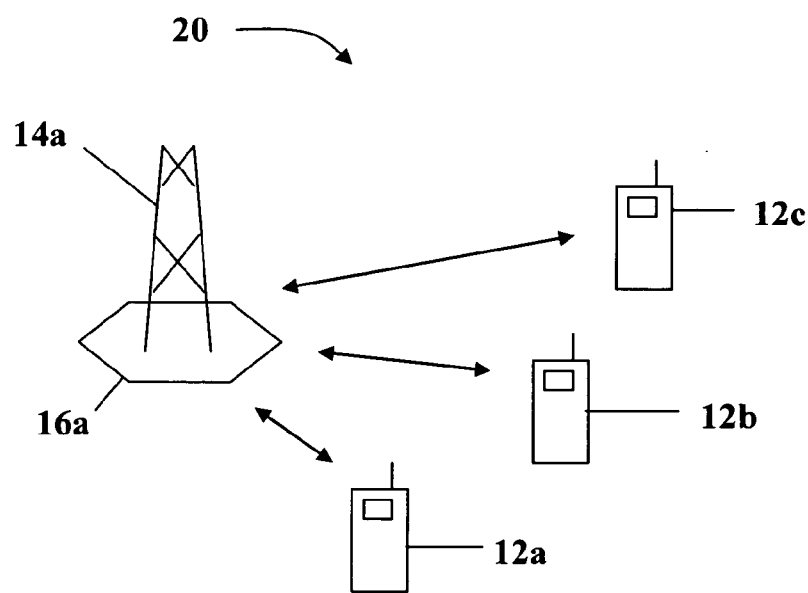
FIG. 2 is another generalized block diagram of a mobile system environment in which embodiments of the invention may be used according to an embodiment of the present invention

FIG. 2 shows another mobile environment 20 in which embodiments of the present invention may be used. The mobile environment 20 includes, without limitation, a plurality of MS 12a, 12b and 12c configured to communicate with a communications network which may comprise a network element such as BS 14a residing within a cell cite 16a. Each of the MS 12a, 12b and 12c may communicate with the BS 14a using a multiplexing scheme. For example, each of the MS 12a, 12b and 12c may communicate with the BS 14a using time division multiple access (TDMA) or another multiplexing scheme. As with the embodiment described above, the communications network may include one or more system simulators for issuing commands to the plurality of MS 12a, 12b, and 12c.

Figure 3:
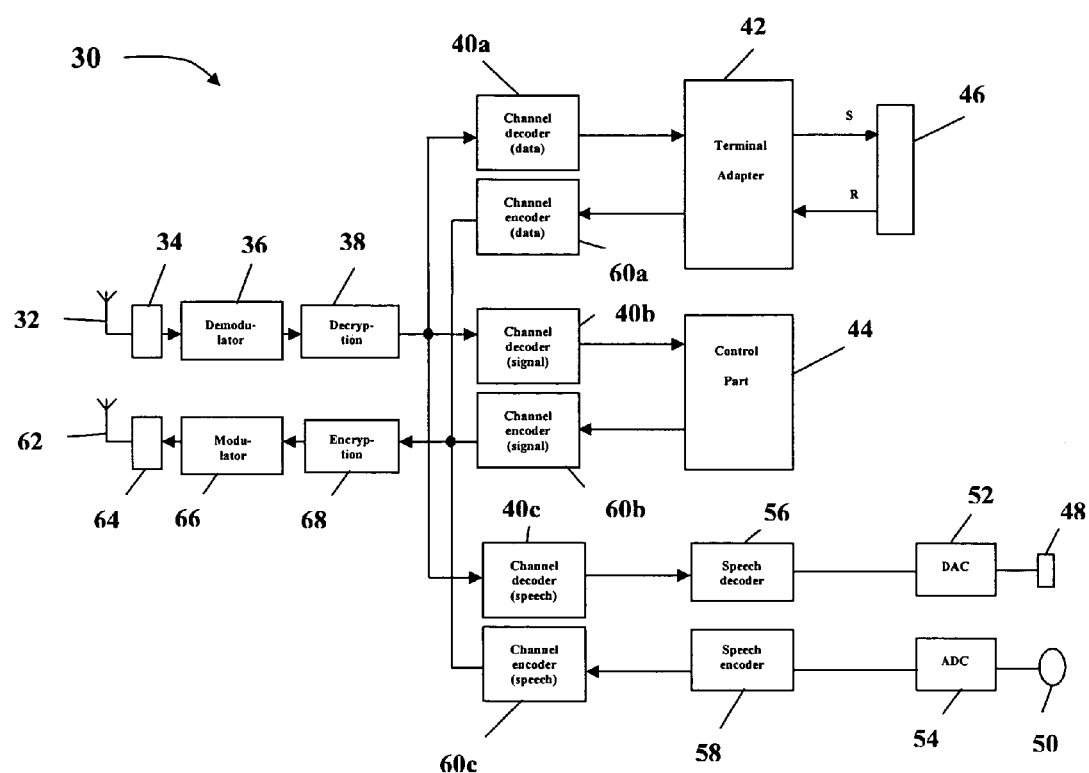
FIG. 3 is a functional block diagram of data transfer channels in a mobile station in which test loops may be implemented of according to an embodiment of the present invention.

FIG. 3 shows a functional block diagram of data transfer channels in an MS in which test loops may be implemented. In FIG. 3, a signal may be received at a receive antenna 32 and passed to receive electronics 34. The signal may then be demodulated at a demodulator 36 and decrypted at a decryption block 38. Once decrypted, the signal may then be sent to channel decoders 40a, 40b and 40c for separating data, signal, and speech, respectively. Data may be sent to a terminal adapter 42 where it may then be sent to a send port 46. In addition, signal information may be sent to a control part 44. Speech information may be sent to a speech decoder 56 and then to a digital-to-analog converter 52. The digital-to-analog converter 52 may send the converted speech to a first transducer 48 such as a speaker, for example.

For transmissions originating with the MS, data may originate with the receive port 46 and be sent to the terminal adapter 42. From there, the data may be sent to a channel encoder 60a for data. Signal information may originate at the control part 44 where it is sent to a channel encoder 60b for signal information. Speech information may originate at a second transducer 50, such as a microphone, for example, where it is then sent to an analog-to-digital converter 54. From the analog-to-digital converter 54, the converted speech is then encoded at a speech encoder 58 and sent to a channel encoder for speech 60c. All encoded information is then sent to an encryption block 68. The encoded, encrypted information may then be modulated by a modulator 66 and sent to transmit electronics 64 and transmitted with a transmit antenna 62.

Figure 4:
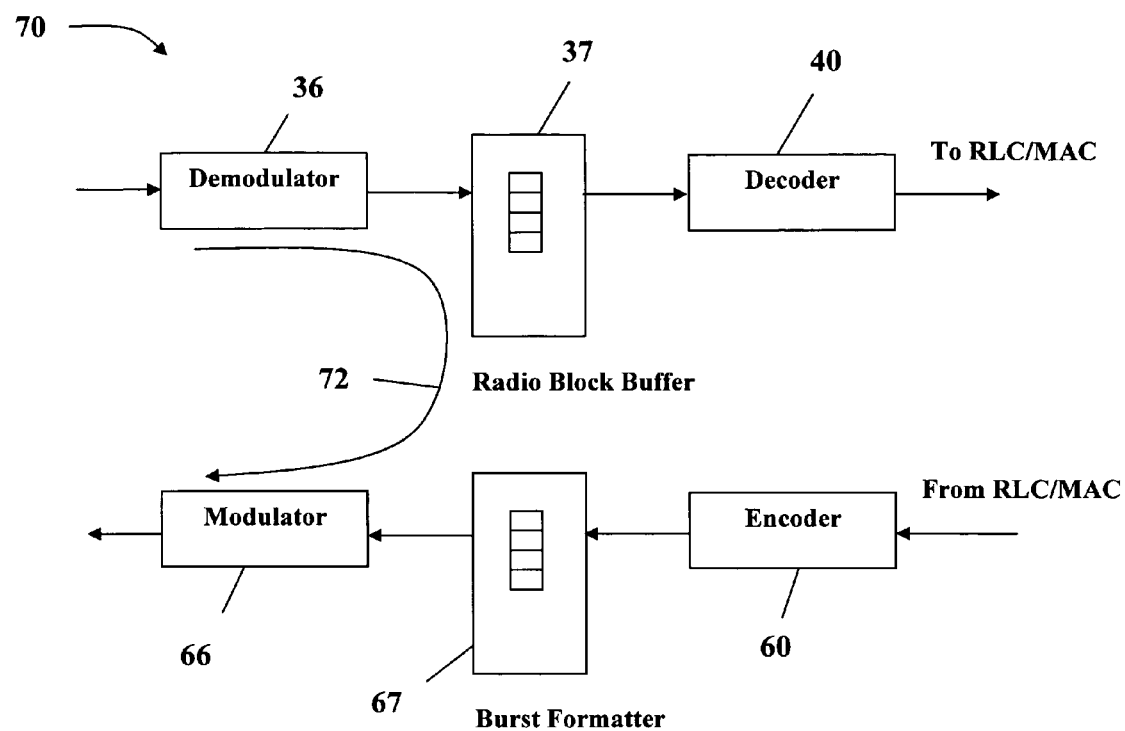
FIG. 4 is a functional block diagram of a radio block portion of transmit and receive paths that may be used for testing according to an embodiment of the present invention.

Testing of the MS may use any portion of the transmit and receive paths shown in FIG. 3. For example, FIG. 4 shows a functional block diagram 70 of a radio block portion of the transmit and receive paths that may be used for testing. According to an embodiment of the present invention, a test loop 72 that includes, without limitation, the demodulator 36, a radio block buffer 37, a burst formatter 67 and the modulator 66 may be used to support Bit Error Ratio (BER) testing. As can be seen in FIG. 4, using the test loop 72, testing may be performed before channel decoding/encoding. The MS may receive a data block, demodulate it at the demodulator 36, transfer the demodulated data to a radio block buufer 37, then, before decoding the data, send the demodulated data to a burst formatter 67, where it is then sent to a modulator 66 for modulation and subsequent transmission back to the communications network. According to an embodiment of the present invention, the test loop 72 may be implemented at a physical RF network layer.

Figure 5:
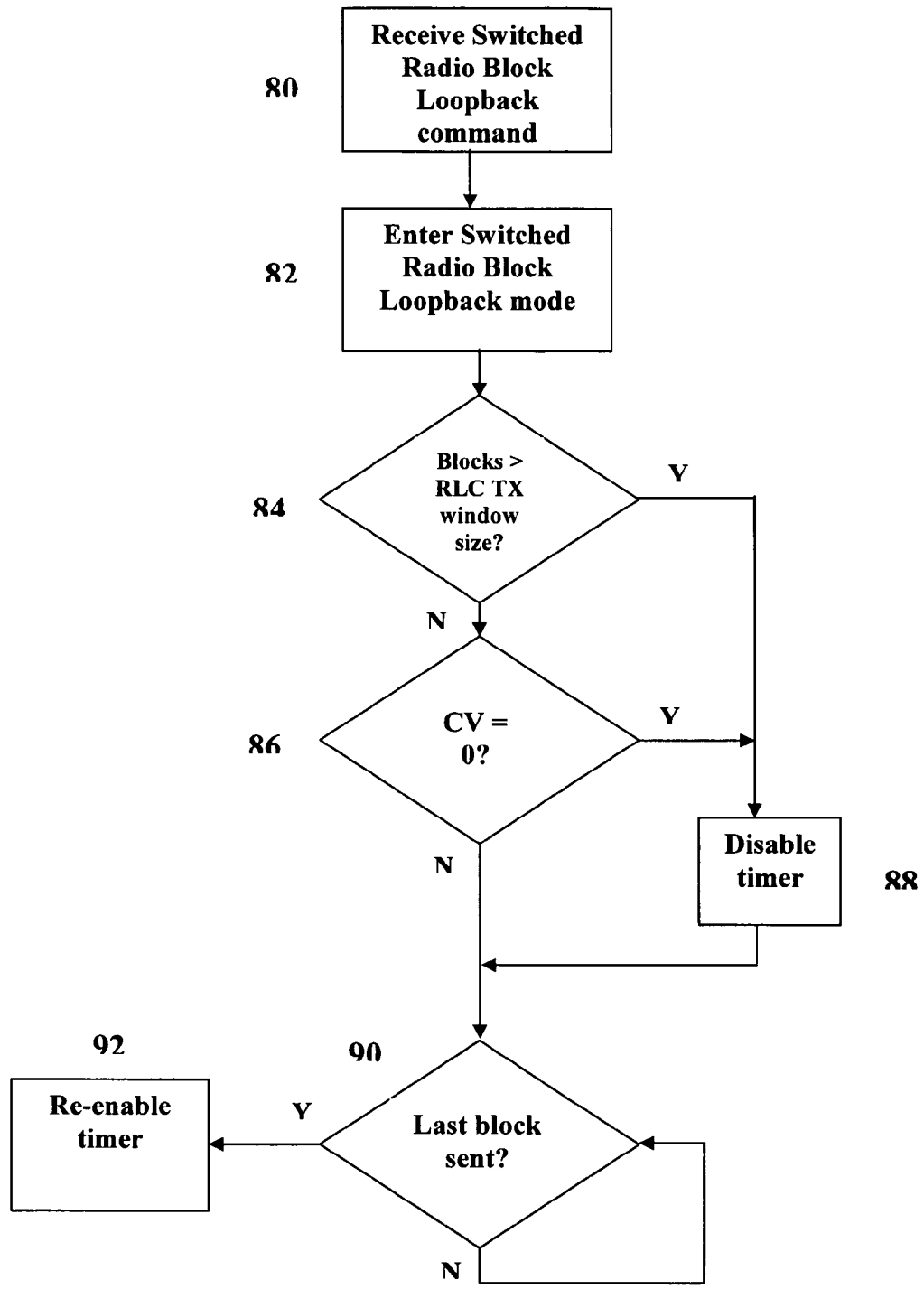
FIG. 5 is a flow diagram for Switched Radio Block Loopback mode testing according to an embodiment of the present invention.

FIG. 5 shows a flow diagram for Switched Radio Block Loopback mode testing according to an embodiment of the present invention. At step 80, an MS receives a command from the communications network or system simulator to enter a loopback test mode such as the EGPRS Switched Radio Block Loopback mode. It is assumed that the MS is in packet idle mode. In addition, the communications network or system simulator establishes a downlink temporary block flow (TBF) on one timeslot. The MS is thus forced to establish an uplink TBF in RLC unacknowledged mode. When the communications network or system simulator receives the MS request for uplink resources, the network establishes the uplink TBF. The downlink and uplink TBF continue through the test mode operation. The MS enters Switched Radio Block Loopback mode at step 82.

While the MS is in Switched Radio Block Loopback mode ON, it does not send any control messages or data from RLC/MAC to its own physical link layer for transmission. However, at step 84, a determination is made as to whether the number of data blocks sent by RLC is greater than the RLC transmit window size. If the number of data blocks sent by RLC is greater than the RLC transmit window size, then a timer, such as the T3182 timer, is disabled at step 88. If the number of data blocks sent by RLC is not greater than the RLC transmit window size, then a determination is made as to whether the countdown value (CV) is equal to zero. If the countdown value is equal to zero, then the T3182 timer is again disabled at step 88. If the countdown value is not equal to zero, then a determination is made as to whether the last data block has been sent at step 90. If the last data block has not been sent, RLC continues to monitor the data blocks until the last data block has been sent at step 90. Once the last data block has been sent, the T3182 timer can be re-enabled at step 92.

Embodiments of the present invention permit mobile stations to execute a switched radio block loopback mode test for a period of time longer than the transfer time from zero to a full RLC transmit window plus five seconds (five seconds being the value of the T3182 timer). Thus, the ability to obtain reliable RF measurements for a mobile station is greatly enhanced.

While particular embodiments of the present invention have been shown and described, it will be obvious to those skilled in the art that the invention is not limited to the particular embodiments shown and described and that changes and modifications may be made without departing from the spirit and scope of the appended claims.

What is claimed is:

1. A method comprising:
A mobile station receiving a command to enter a test mode; a functional subsystem enabling a timer in the mobile station; transmitting data blocks; the functional subsystem disabling the timer when a quantity of the data blocks exceeds a transmit window size or when a countdown value is equal to zero and re-enabling the timer after the last data block has been transmitted; and when the quantity of data blocks does not exceed the transmit window size and when the countdown value is not equal to zero, continue transmitting data blocks until the last data block has been transmitted.

2. The method of claim 1 wherein the test mode is a switched radio block loopback mode.

3. The method of claim 2, wherein the timer is a T3 182 timer.

4. The method of claim 1, wherein the mobile station is a mobile telephone.

5. The method of claim 1, further comprising requesting an uplink to a communications network or system simulator.

6. The method of claim 1, wherein the mobile station implements the general packet radio service protocol.

7. The method of claim 1, wherein the data blocks are radio link control data blocks.

8. A system, comprising:
a communications network for issuing commands;
a mobile station for receiving and transmitting information; and
a timer resident in the mobile station,
wherein the mobile station is configured to:
when the communications network has issued a command to put the mobile station in a test mode and when a quantity of the data blocks exceeds a transmit window size or a countdown value is equal to zero, disable the timer and re-enable the timer after the last data block has been transmitted, and,
when the quantity of data blocks does not exceed the transmit window size and if the countdown value is not equal to zero, continue transmitting information until the last data block has been transmitted.

9. The system of claim 8, wherein the test mode is a switched radio block loopback mode.

10. The system of claim 9, wherein the timer is a T3 182 timer.

11. The system of claim 8, wherein the mobile station is a mobile telephone.

12. The system of claim 8, wherein the mobile station is further configured to request an uplink from the communications network.

13. The system of claim 8, wherein the mobile station implements the general packet radio service protocol.

14. The system of claim 8, wherein the data blocks are radio link control data blocks.

15. The system of claim 8, wherein the communications network comprises a system simulator.

16. One or more machine readable media having machine readable instructions stored thereon which, when executed, configure a processor to implement a test procedure method in a mobile station, said method comprising:
receiving a command to enter a test mode;
enabling a timer;
transmitting data blocks while a quantity of data blocks does not exceed a transmit window size and a countdown value is not equal to zero, until a last data block has been transmitted; and
disabling the timer when the quantity of the data blocks exceeds the transmit window size or when the countdown value is equal to zero; and
re-enabling the timer after the last data block has been transmitted.

17. The machine readable media of claim 16, wherein the test mode is a switched radio block loopback mode.

18. The machine readable media of claim 17, wherein the timer is a T3 182 timer.

19. The machine readable media of claim 16, said method further comprising requesting an uplink to a communications network or system simulator.

20. The machine readable media of claim 16, wherein the data blocks are radio link control data blocks.

21. An apparatus comprising:
- a functional subsystem for receiving and transmitting information; and
- a timer resident in the apparatus,
- wherein the functional subsystem is configured to:
    - when the functional subsystem has received a command to put the device in a test mode and when a quantity of data blocks transmitted by the mobile system exceeds a transmit window size or a countdown value is equal to zero, disable the timer and re-enable the timer after the last data block has been transmitted, and,
    - when the quantity of data blocks does not exceed the transmit window size and if the countdown value is not equal to zero, continue transmission of data by the mobile system until the last data block has been transmitted.

22. The apparatus of claim 21, wherein the test mode is a switched radio block loopback mode.

23. The apparatus of claim 22, wherein the timer is a T3 182 timer.

24. The apparatus of claim 21, wherein the device is a mobile telephone.

25. The apparatus of claim 21, wherein the functional subsystem is further configured to request an uplink from a communications network or system simulator.

26. The apparatus of claim 21, wherein the data blocks are radio link control data blocks.

27. The apparatus of claim 21, wherein the functional subsystem is configured to implement the general packet radio service protocol.

\* \* \* \* \*

UNITED STATES PATENT AND TRADEMARK OFFICE
CERTIFICATE OF CORRECTION

PATENT NO. : 7,512,092 B2  Page 1 of 1
APPLICATION NO. : 11/018294
DATED : March 31, 2009
INVENTOR(S) : Jukka Laurila It is certified that error appears in the above-identified patent and that said Letters Patent is hereby corrected as shown below:

In Column 7, Claim 21, Line 9:
    Please delete "device" and insert --apparatus--.

In Column 7, Claim 21, Line 10:
    Please delete "mobile system" and insert --apparatus--.

In Column 7, Claim 21, Line 17:
    Please delete "mobile system" and insert --apparatus--.

In Column 8, Claim 24, Line 6:
    Please delete "device" and insert --apparatus--.

Signed and Sealed this

Sixteenth Day of June, 2009

JOHN DOLL
*Acting Director of the United States Patent and Trademark Office*